United States Patent [19]
Lee

[11] Patent Number: 5,689,998
[45] Date of Patent: Nov. 25, 1997

[54] CONTINUOUS-TORQUE VARIABLE-SPEED TRANSMISSION

[75] Inventor: Gary D. Lee, Woodland Hills, Utah

[73] Assignee: The Anchored Corporation, Woodland Hills, Utah

[21] Appl. No.: 276,024

[22] Filed: Jul. 15, 1994

Related U.S. Application Data

[63] Continuation-in-part of Ser. No. 220,501, Mar. 31, 1994, Pat. No. 5,542,310.

[51] Int. Cl.$^6$ .................................. F16H 3/08; F16H 3/38
[52] U.S. Cl. .................................. 74/371; 74/372; 74/339; 475/150; 475/152
[58] Field of Search .................................. 475/150, 152, 475/207, 72, 73, 79, 80; 74/336 R, 339, 371, 372

[56] References Cited

U.S. PATENT DOCUMENTS

| | | | |
|---|---|---|---|
| 501,381 | 7/1893 | Taylor | 74/372 |
| 683,003 | 9/1901 | Schellenbach | 74/371 |
| 735,068 | 8/1903 | Curtis | 74/371 |
| 921,522 | 5/1909 | Dunkel | 74/371 |
| 965,461 | 7/1910 | Holland | 74/371 |
| 1,015,254 | 1/1912 | Whisler | 192/71 |
| 1,099,587 | 6/1914 | Bugatti | 74/372 |
| 1,102,427 | 7/1914 | Morgan | 74/372 |
| 1,189,136 | 6/1916 | Kirchhoff | 74/371 |
| 1,597,944 | 8/1926 | Wilson | 74/371 |
| 1,661,892 | 3/1928 | Girones | 74/371 |
| 1,740,725 | 12/1929 | Brown | 74/371 |
| 2,045,835 | 6/1936 | Coen | 74/337 |
| 2,168,322 | 8/1939 | Butler | 474/73 |
| 2,320,960 | 6/1943 | Wheaton | 74/336.5 |
| 2,426,154 | 2/1947 | Chilton | 423/272 |
| 2,505,464 | 4/1950 | Debuit | 280/260 |
| 2,590,232 | 3/1952 | Chilton | 74/336 R |
| 2,592,983 | 4/1952 | Violet | 162/246 |
| 2,807,965 | 10/1957 | Frank | 74/371 |
| 2,861,461 | 11/1958 | Kreidler | 74/371 |
| 3,028,763 | 4/1962 | Vetsch | 74/371 |
| 3,154,962 | 11/1964 | Mukherjee | 74/337 |
| 3,463,028 | 8/1969 | Polidor | 74/366 |
| 3,662,613 | 5/1972 | Ingalls | 74/371 |
| 3,686,957 | 8/1972 | Kim et al. | 74/371 |
| 3,691,861 | 9/1972 | Stürmer | 419/6 |
| 3,707,884 | 1/1973 | Go | 74/372 |
| 3,812,735 | 5/1974 | Von Kaler et al. | 74/371 |

(List continued on next page.)

FOREIGN PATENT DOCUMENTS

| | | |
|---|---|---|
| 0079176 | 10/1982 | European Pat. Off. . |
| 1037278 | 8/1958 | Germany . |
| 1919008 | 10/1970 | Germany . |
| 3037990 | 5/1982 | Germany . |
| 439345 | 9/1948 | Italy . |
| 20127 | 12/1906 | United Kingdom . |
| 566411 | 12/1944 | United Kingdom . |

*Primary Examiner*—Khoi Q. Ta
*Attorney, Agent, or Firm*—Paul S. Evans

[57] ABSTRACT

A transmission apparatus for changing the speed of a driven member relative to the speed of a driving member for transmitting effectively continuous torque transfer between the members. The apparatus includes cam gears driven by a driving member, driven gears in continuous engagement with the cam gears, and a driven member which journals the driven gears for rotation. One section of the driving member is hollow and has a plurality of radially extending apertures, each containing a reciprocating detent for engaging an inner cam surface of a corresponding cam gear. A shift member mounts within a bore of the driving member and rotates about the longitudinal axis of the driving member to cause the detents to reciprocate between a cam gear engaged position and a disengaged position. By timing the movement of the shift member and the design of the cam surfaces on the cam gears, one cam gear can be simultaneous engaged while another is being disengaged to produce a gear ratio change for transmitting effectively continuous torque transfer between the driving and driven members.

24 Claims, 5 Drawing Sheets

U.S. PATENT DOCUMENTS

| | | | |
|---|---|---|---|
| 4,088,037 | 5/1978 | Carr | 74/371 |
| 4,141,424 | 2/1979 | Murayama et al. | 74/372 |
| 4,292,855 | 10/1981 | Murayama | 74/371 |
| 4,343,612 | 8/1982 | Blanchard | 440/75 |
| 4,505,164 | 3/1985 | Yoshida | 74/371 |
| 4,662,241 | 5/1987 | Edwards | 475/206 |
| 4,702,121 | 10/1987 | Hartman | 74/375 |
| 4,716,777 | 1/1988 | Hartman | 74/372 |
| 4,779,475 | 10/1988 | Irikura et al. | 74/371 |
| 4,858,739 | 8/1989 | Nemoto | 74/371 |
| 4,966,574 | 10/1990 | von Kaler et al. | 74/371 |
| 5,030,179 | 7/1991 | Ganoung | 477/120 |
| 5,063,794 | 11/1991 | von Kaler | 74/371 |
| 5,094,121 | 3/1992 | von Kaler | 74/371 |

CONTINUOUS-TORQUE VARIABLE-SPEED TRANSMISSION

CROSS-REFERENCE TO RELATED APPLICATIONS

This application is a continuation-in-part of application Ser. No. 08/220,501 filed Mar. 31, 1994, now U.S. Pat. No. 5,542,310, in the name of Gary D. Lee, entitled "Continuous-Torque Variable-Speed Mechanical Gear Transmission", which is commonly assigned with the present application. The entire contents of the No. '310 Patent are expressly incorporated herein by reference.

TECHNICAL FIELD OF THE INVENTION

The present invention pertains generally to a method and an apparatus for torque transfer between a driving member and a driven member and is more particularly directed to a new and improved method and apparatus for changing a gear ratio in a transmission for transmitting effectively continuous torque transfer during such change.

BACKGROUND OF THE INVENTION

The advent of the industrial revolution was brought on by the development of reliable and relatively inexpensive rotating power sources of the thermodynamic engine type, first in the form of the steam engine. Industry, transportation and agriculture have all progressed rapidly utilizing these engines. Later the duties of the steam engine were shared or displaced by newer thermodynamic engines of the internal combustion type, such as the diesel and otto cycle engines. Today these rotating power sources are ubiquitous and put to a myriad of uses in modern day society.

One of the general characteristics of the rotating power source is its torque or power curve where an engine will produce different amounts of power at different speeds. To most efficiently utilize the available power, such engines are operated in speed ranges which are based on their mechanical design. These ranges do not generally coincide with the desired speed and torque requirements of the end use or loads, hence, a transmission was developed to transfer and regulate the torque from such engines to the load.

A transmission usually comprises multiple sets of gears or speed variance devices to allow different speed ratios between the power source and the load and a means for changing or shifting between those ratios. In this manner the speed of the power source can be varied to deliver more or less torque while the load is changing at a constant or controlled speed for the load. Conversely, with a transmission a power source which is operated most efficiently at a constant speed can be used over a wide range of output loads and speeds.

For many years the changing of gear ratios in a standard transmission has been accomplished by disengaging the engine from the transmission with a clutch. A clutch is a device which allows the power source to be decoupled momentarily so that the gear can be changed and then recoupled. The gear to be shifted into is not under load and can be brought up to the speed of the load. The clutch is then reengaged by bringing two frictional surfaces together which have some slip to allow the engine load speeds and torque transfer to equalize. The slip in the clutch allows the two different rotational speeds of the engine and load to be matched for different power outputs and torque requirements.

Transmissions which completely decouple the power source from the load while the gears are being shifted exhibit several disadvantages. For example, when the engine of heavy equipment is under extreme loads, the appropriate gear must be chosen at the beginning of the haul to avoid stopping to shift gears during the haul which causes a loss of momentum. A heavily loaded gear can not be "shifted on the fly" because the instant the clutch is disengaged the load speed slows and the unloaded engine races causing a speed mismatch too great to be handled by the slip in the clutch. If the engine speed is controlled to match the load speed, the sudden application of a heavy load which exceeds its power output causes the engine to stall.

Another downside of a clutch system is the necessity of an operator to properly time shifts while coordinating and judging the load/speed requirements between the engine and output. Many shifts are not made efficiently lending to wasted power during the transition from one gear to another. While this may not be significant in passenger automotives, gains in operating efficiencies of larger, more heavily loaded engines translate directly into saved fuel and operating costs.

The human element of timing a gear shift becomes more critical when made under extreme conditions. For example, in racing environments a very short time is available during accelerations (upshifting) or decelerations (downshifting) to recognize a change in the load/speed requirement, coordinate actuation of the clutch and then to make the shift. The race driver with the most efficient shifting saves time, fuel and wins the race. In drag racing the timing of gear shifts to produce maximum acceleration while not losing traction is the most critical element to winning. This critical timing and higher coordination is also required on shifts made for heavily loaded trucks on upshifts and downshifts during travel uphill and downhill. Automatic transmissions have been developed in an attempt to overcome these problems. The typical automatic transmission usually comprises a hydraulic torque converter wherein the rotation and power from the engine operates the hydraulic fluid which is coupled to different sets of vanes (or bands) on the output side to transfer the power in the moving fluid. However, the automatic transmission is relatively complex to build and manufacture and thus costly to produce. Furthermore, it is much less efficient than a direct geared transmission while not changing gears because the principle relied on is one of fluid momentum transfer resulting in power loss in the input and output sides.

Non-gear designs have been used for the purpose of changing gear ratios while providing continuous torque. One such design is a double pulley arrangement constructed of metal elements that drive a V-belt. This design is presently used in small engine designs, such as those used with snowmobiles. However, belt wear resulting in slippage and/or breakage is a common problem.

Other designs have attempted to change gear ratios while providing continuous torque. One design uses rolling elements between an inner input gear and an outer output gear arranged much like an epicyclic gear train. The rolling elements continuously change the gear ratio, however, it is torque-limited because it relies on the coefficient of static friction to transmit forces between the rolling elements. Attempts have also been made to change gear ratios by randomly forcing detents between the closely spaced teeth of internally-toothed gears, but this brute force approach requires the disengagement of torque from the transmission. Moreover, this design causes rapid wearing and/or breakage of both the detents and the internal teeth, and binding and/or lockup between adjacent gears.

What is needed is a transmission which has the efficiency and simplicity of the direct geared transmission, does not interrupt torque transfer while shifting, and does not rely on human intuition for timing shifts.

SUMMARY OF THE INVENTION

The invention provides a transmission apparatus for changing the speed of a driven member relative to the speed of a driving member for transmitting effectively continuous torque transfer between the members. The invention comprises a plurality of driving gears each adapted to move in response to the driving member and a plurality of driven gears each adapted to move the driven member. The driving gears and driven gears are continuously engaged with each other to form gear pairs which are in different ratios and are adapted to vary the speed of the driven member relative to the driving member when there is a shift between gear pairs. At least one of the driving and driven gear sets is journaled for rotation on its respective driving and driven member. An actuating means is used to selectively shift between the different driving and driven gear pairs by simultaneously engaging one of the journaled gears to its respective member while disengaging another one of the journaled gears.

In accordance with one of the objects of the invention, the simultaneous engagement and disengagement of different gear pairs changes the gear ratio, and consequently the relative speeds between the driving and driven members, for transmitting effectively continuous torque transfer between the driving member and the driven member. There is no need to mesh a gear under load with another gear being driven at different speed because the gear pairs providing the variable speed ratios are in constant engagement with each other, thereby eliminating the need for a clutch or similar devices. The apparatus eliminates the torque lost between shifts in a standard clutch type transmission allowing the engine to work more efficiently when down shifting and upshifting.

The human element in coordinating the timing between shifting gears is also eliminated. Shifting occurs much faster and more efficiently than a human can react by essentially an automatic shifting device. The device retains the efficient direct gearing of the standard transmission while not requiring the expensive and complex torque converters of an automatic transmission.

The present invention enhances the invention disclosed in the No. '501 Lee application. The invention disclosed in the No. '501 Lee application must be designed to withstand stresses that arise from the forces necessary to accelerate or decelerate the motor and/or load to speeds which are compatible given the new gear ratio during a gear change. For example, during an upshift in gear ratios, the driving means must first speed up and then immediately slow down to its target speed to complete a shift. This shift characteristic means that a torque spike will be propagated through the drive train. The present invention eliminates a torque spike through a reconciling means which is used to match the speed of the driving means with that of the driven means as the relative speed is varied. The reconciling means also provides for a longer shift window so the power source and/or load are not required to react to the new gear ratio as quickly as a shift takes place. Hence, the stresses in the transmission are lowered, thereby allowing for a reduction in the transmission size and requisite strength.

The preferred embodiment of the reconciling means ("torque spike anticipator") is accomplished by incorporating a planetary gear system into either the driving or driven means. The planetary's sun gear is rigidly attached to the power source and it's carrier is rigidly attached to the driving means. One skilled in the art will recognize that the sun gear may also be connected to the driving means and the carrier may also be connected to the power source. The torque spike anticipator inherently isolates the primary torque carrying member of the shift mechanism from the load and rotational inertia of the power train. While maintaining its guided and constrained characteristics, small forces can then accelerate or decelerate the shift member in calculable anticipation for a downshift or upshift respectively. This is referred to as the synchronization phase shift. After an active gear set is disengaged and the to-be-engaged gear is simultaneously engaged, the torque spike anticipator provides for a constant rpm rotation of the motor. It then, through an infinitely variable ratio, reconciles the load and motor. During an upshift, the ring gear of the planetary gear system is used as a second input and is decelerated in advance of the upshift by a secondary power source such that the motor speed is reconciled to the load speed. During a downshift, the ring gear is rotated in the opposite direction and accelerated in advance of the downshift. After a gear shift, the ring gear is held fixed by means of a brake or the secondary power source during operation of the transmission. The secondary power source may be released such that the torque spike anticipator acts as an absorber rather than an anticipator which is accelerated or decelerated in advance of the change in gear ratios.

In the illustrated implementation, the transmission apparatus includes a plurality of annular cam gears or driving gears driven by a driving member on which the cam gears are journaled for rotation and a plurality of reducing gears or driven gears in continuous engagement with the cam gears forming different gear ratio pairs. The driving member comprises a rotatably mounted hollow drum having a plurality of radially extending apertures, each containing a reciprocating detent for engaging and disengaging a corresponding cam gear.

The actuating means includes a shift member rotatably mounted within the inner bore of the driven member for rotation about its longitudinal axis and having at least one cam surface for selectively moving one detent between an engaged position and a disengaged position on one cam gear while simultaneously moving another detent from a disengaged position to an engaged position on another cam gear.

The simultaneous engagement and disengagement between the two gear pairs associated with the cam gears produces a smooth shift in gear ratios where the torque transfer between the driving member and driven member is effectively continuous and is advantageously transferred during the shift by the continuous engagement of at least one of the detents to one of the cam gears at all times. The angular velocity difference between the two cam gears is reconciled by the timing of the shift during an allowed shift window which is dependent upon the design of the cam gears and the difference in angular velocity.

Preferably, an inner cam surface of each cam gear has peak sections and valley sections and axial movement of the shift member is timed relative to the position of the peak sections and valley sections on adjacent cam gears. The position and velocity of the gears can be monitored by any number of ways, such as a bar code placed on each gear, thereby allowing for computer-aided shifting.

The invention lends itself to several applications and has several variables. For example, the gear ratios as well as the number of peaks and valleys in the cam gears may all be manipulated to accomplish the task for which the particular application of the invention is intended.

Therefore, the essence of the invention lies in the following principles: (a) the cams machined into an inner perimeter of driving gears become a common link to other driving gears which vary in size and rotational speed. By means of this common link, an engagement device can follow one cam out of engagement as another engagement device simultaneously follows a cam of an adjacent gear into engagement; (b) the required timing to start the above mentioned exchange can be determined from the position of the cam gears by manipulating the ratio of the gears in relation to the number of cams repeated around the inner perimeter of the cam gears; (c) the movement of the engagement devices can be synchronized by knowing the angular velocity difference between adjacent cam gears by sensing the speed of a driving member and setting the gear ratios between adjacent cam gears; and (d) differing angular velocities of the gears can be reconciled by a driving member commonly connected to the engagement devices.

BRIEF DESCRIPTION OF THE DRAWINGS

The invention may be further understood from consideration of the following detailed description of the preferred embodiment when taken in conjunction with the accompanying drawings in which.

DETAILED DESCRIPTION OF THE PREFERRED EMBODIMENT

Figure 1:
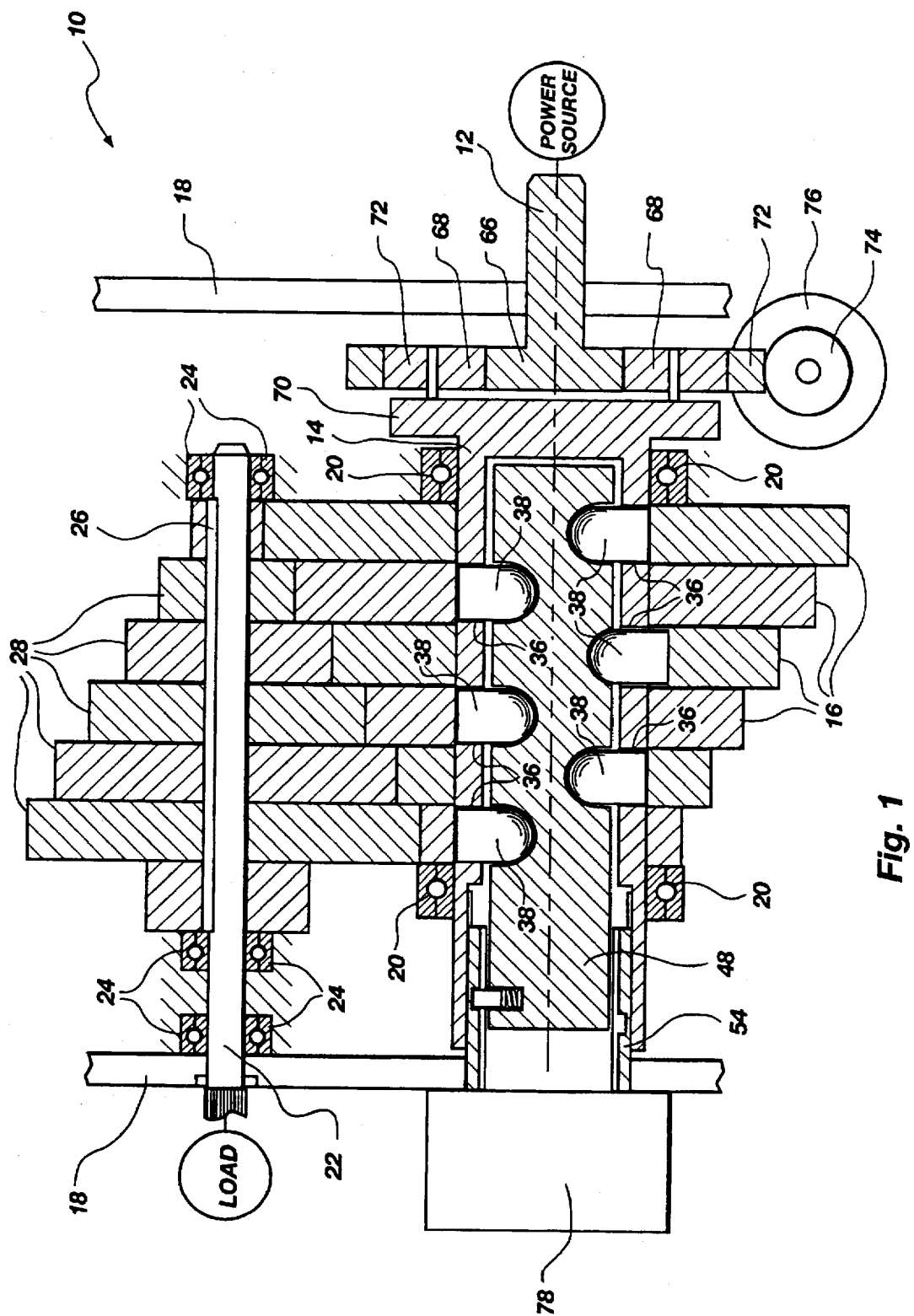
FIG. 1 is a partially schematic side elevational view, in cross section, of a transmission apparatus constructed in accordance with the teachings of the invention.

FIG. 1 shows a partially schematic, side elevational view in cross section of a preferred embodiment of a transmission apparatus 10 constructed in accordance with the invention. An input shaft, or driving member, 12 includes an enlarged hollow drum 14 on which a plurality of cam gears, or driving gears, 16 are journaled for rotation inside the housing 18. The drum 14 is rotatably mounted by bearings 20. The bearings 20 also retain the cam gears 16 in their proper lateral positions along drum 14. The input shaft 12 is connected to a source of power, preferably a thermodynamic engine, or the like. The output shaft 22 is journaled for rotation inside the housing 18 by bearings 24. The bearings 24 mount the output shaft 22 for axial rotation without lateral movement, and may be of the thrust bearing type to prevent such movement. The output shaft 22 mounts through the center aperture of, and is locked by a key 26 to, each of a plurality of driven gears 28 of varying circumferences.

Each of the cam gears 16 is continuously engaged by means of a gear tooth profile on its outer circumference to a corresponding gear tooth profile on one of the driven gears 28. Each pair of cam and driven gears, 16 and 28 respectively, has a different gear ratio than an adjacent pair of gears. In many applications, each pair of gears will have a different gear ratio than every other pair of gears in that particular transmission. Preferably, the gear ratios increase in one direction along the drum 14 and consequently decrease in the other direction.

Each cam gear 16 has a uniform cam surface 30 on its inner circumference. The cam surface 30 includes a first and second portion, 32 and 34 respectively, wherein the first portion 32 forms a valley and has a greater diameter than the second portion 34. The second portion 34 forms a peak section and rides on the outer surface of the drum 14. The cam surface 30 can be shaped to influence the characteristics of a shifting sequence, depending upon the application. For example, in a six cam segment design, where the rotations of adjacent cam gears 16 differ by one third for every rotation of the input shaft 12, the cam segments can be divided into two sets, one set which lines up for a shift on a zero degree (0) mark of the input shaft 12 and the other set which lines up for a shift on a 180 degree mark. The outer diameter of the drum 14 is sized to fit inside the peak section 34 of the cam gears 16 with a sliding oil tolerance fit. Guide apertures 36 (generally two or more to correspond with the valley section 32 in the cam surface 30), extending from the inner surface of the central bore of the drum 14 to its outer surface, contain and guide detents 38 which are shaped to engage the valley section 32 of the cam surface 30. The detents 38 may have a variety of shapes, such as spherical, rectangular or triangular, and preferably the shape of the engaging portion 40 of the detents 38 conforms to the shape of the valley section 32 so as to maximize the surface to surface contact area for locking the cam gear 16 to the drum 14 during full engagement of that cam gear 16. The detents 38, each of which may be a metal ball, a pin, a bolt, a catch, a rectangular shaft, or the like, have sides shaped to slide in and out of the guide apertures 36 cut in the drum 14, and a bottom end 42 shaped to follow the contoured cam grooves 44 in the cam surface 46 of the shift member 48, wherein the grooves 44 extend around the rotational axis of the shift member 48. The grooves 44 may be shaped in a manner to retain the bottom end 42 in the grooves 44. For example, if the bottom end 42 is spherically shaped, the sides of the grooves 44 can be curved so as to retain the bottom end 42 in the grooves 44. One skilled in the art will recognize that the bottom end 42 may be curved inward or outward as well as the sides of the grooves 44 for retention of the detent 38. The bottom end 42 may also be retained in the grooves 44 by means of a keyway. The cam surface 46 includes a first and second portion, 47 and 49 respectively, wherein the first portion 47 has a greater diameter than the second portion 49 for holding a detent 38 in an engaged position whereby the detent 38 extends through a corresponding guide aperture 36 in the drum 14 to engage a driving gear 16 on the input shaft 12. The second portion 49 of the cam surface 46 has a lesser diameter than the first portion 47 for holding a detent 38 in a disengaged position.

The inner cam surface 30 of the cam gears 16 and the detent 38 arrangement are configured in a manner that minimizes the forces acting upon the shift member 48 and maximizes the forces acting upon the aperture wall 50 of the drum 14. Generally, the steeper the angle or curve of the engaging portion 40 of the detent 38 and the corresponding first incline section 52 of the cam surface 30, the more force is directed into the drum 14. The detent 38, cam surface 30 tolerances, and an optional oil orifice in the detent 38 control the movement of oil for the purpose of lubricating and dampening the shift. The oil also serves to dampen torque spikes when changing gear ratios. Each set of guide apertures 36 may be located inline or offset with respect to each other in the wall of the drum 14. This places each set of the detents 38 in the radial plane of its corresponding cam gear 16.

Alternatively, the cam gear 16 assemblies may be associated with the output shaft 22 instead of the input shaft 12. Separate cam gear 16 assemblies may also be associated with both the input and output shafts 12 and 22 respectively. Although these designs may provide different input and output ratios, the rules of interaction between the components of the shifting assembly are the same in each design.

The shift member 48 is mounted within the central bore of the drum 14 such that it is capable of rotational movement about the longitudinal axis of the input shaft 12. The bottom ends 42 of the detents 38 ride in the grooves 44 of the cam surface 46, each extending around the rotational axis and having a central portion extending radially upon which the detents 38 ride for radial reciprocating movement. The shift member 48 is not limited to having a number of cam grooves 44 equal to the number of detents 38. For example, the shift member 48 can be rotated in the drum 14 to change its angular orientation with respect to the drum 14 in order to utilize one set of cam surfaces for an upshift cycle and then rotated back to utilize another set of cam surfaces for a downshift cycle.

Figure 4:
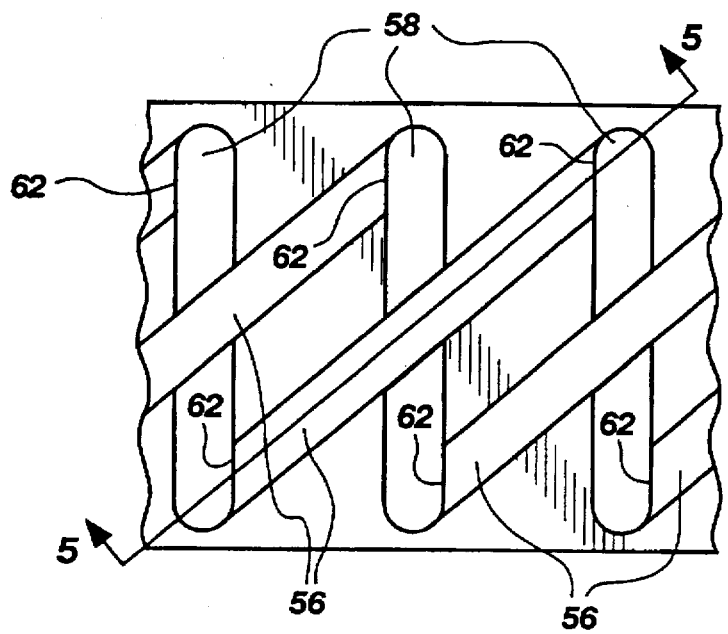
FIG. 4 is a fold out view of the inner surface of the shift actuating collar showing the helical and parallel grooves.
Figure 5:
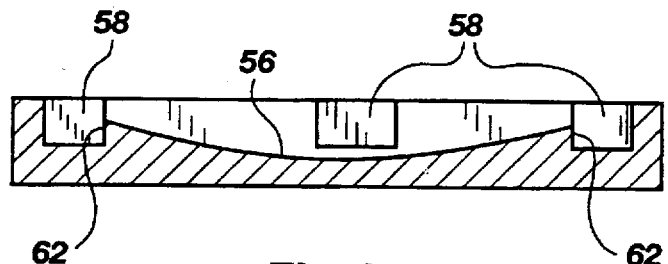
FIG. 5 is a cross-section view of the helical and parallel grooves taken along section line 5—5.
Figure 6:
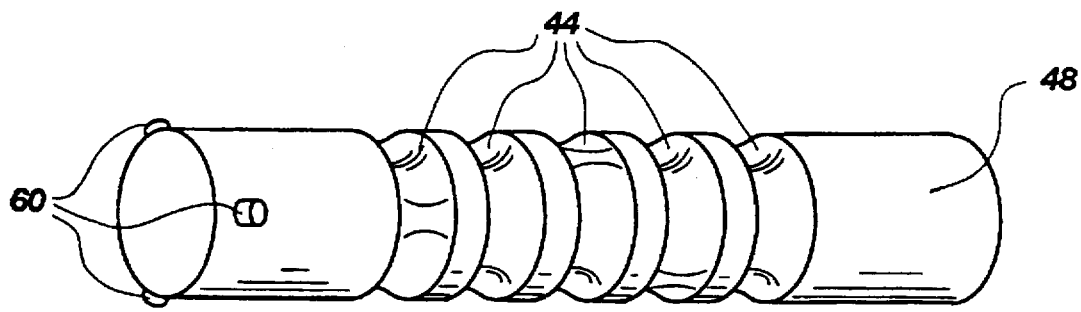
FIG. 6 is a perspective view of the shift member showing the cam surfaces and spring-loaded pins.
Figure 7:
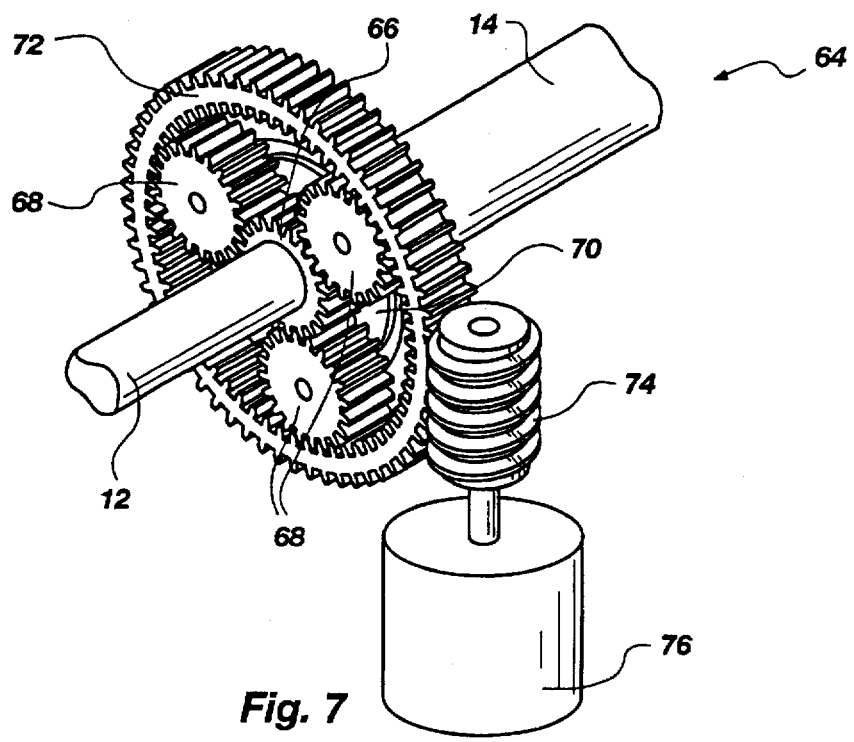
FIG. 7 is a perspective view of the reconciling means showing a planetary gear system powered by a secondary power source.
Figure 8:
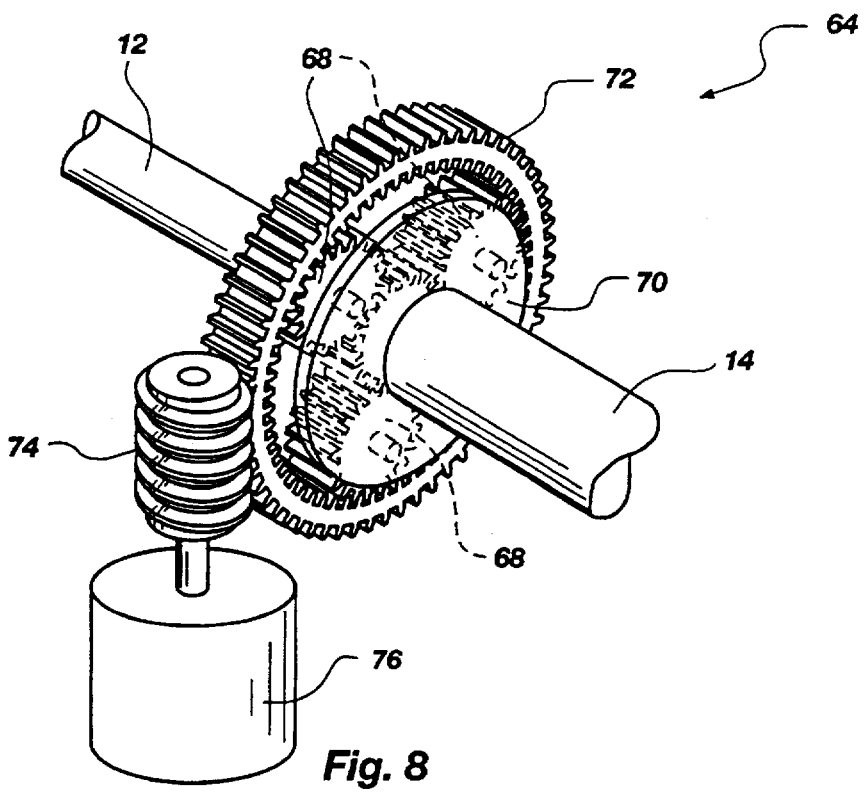
FIG. 8 is an end view of the planetary gear system showing the hollow drum attached to the carrier.

A shift member positioning means is used to control and change the position of the shift member 48. This can be accomplished in a variety of ways, such as by a mechanical lever, a set of gears, an electrical motor, an electrical solenoid, a pneumatic mechanism, or another device for moving shift member 48. All these positioning mechanisms must be responsive to timing and capable of synchronizing the rate of shift member 48 movement with the detents 38. The shift member positioning means also may be responsive to a torque-sensing device in order to initiate a shift in automatic response to the load on the output shaft 22. The positioning means preferably comprises a shift actuating collar 54 integrally attached to one end of the drum 14. The shift actuating collar 54 is substantially cylindrical in shape having a hollow central bore. The outer surface of the collar 54 is splined so as to engage a corresponding set of splines located on the inner surface of the drum 14. The inner surface of the hollowed end of the collar 54 is configured with a network of grooves, the depth of each groove varying in its radial distance from the collar's 54 longitudinal axis, with a first set of helical grooves 56 wound helically about the collar's 54 longitudinal axis and a second set of parallel grooves 58 parallel to the longitudinal axis. FIG. 4 is a fold out view of the inner surface of the shift actuating collar showing the helical and parallel grooves. The helical grooves 56 extend at a radial distance greater than the radial distance of the parallel grooves 58 at its midpoint and at a radial distance less than the radial distance of the parallel grooves 58 at the ends of each helical groove 56. The parallel grooves 58 extend at a constant radial distance about the collar's 54 longitudinal axis. Each end of the helical grooves 56 is connected in series to the parallel grooves 58 such that a step 62 extends radially outward as the helical groove 56 merges into the parallel groove 58, the helical grooves 56 and parallel grooves 58 forming a closed loop within the inner surface of the collar 54 and intersecting at their respective midpoints. A plurality of spring-loaded pins 60, extending radially outward from the end of the shift member 48, are each engaged by the helical grooves 56. The helical grooves 56 are configured such that during full engagement of any of the gear pairs, the pins 60 are locked in one angular position with respect to the collar 54 and thus the drum 14.

A shift is actuated upon translation of the collar 54. The helical grooves 56 force the pins 60 to respond by moving radially inward against the outward force of their springs while simultaneously rotating the shift member 48 at a fixed angle relative to the drum 14. As the shift member 48 is rotated relative to the drum 14, the first portion 47 of the cam surface 46 of the shift member 48 moves the detent 38 radially outward into the valley section 32 of the cam surface 30 of its associated to-be-engaged cam gear 16, and the first portion 47 of the cam surface 46 of the engaged gear simultaneously moves out from under the detent of the engaged cam gear 16 and allows the detent 38 to move radially inward along the corresponding cam gear's 16 inner cam surface 30. When the shift member 48 has rotated through the angle necessary to complete a shift (fixed in magnitude by the length of the helical grooves 56), the helical groove 56 being followed by the pins 60 stops abruptly at the step 62 where it steps radially outward into the corresponding parallel groove 58. This allows the spring-loaded pins 60 to pop outward, thereby locking the shift member 48 into its new angular position. Moreover, all first portions 47 of the cam surfaces 46 of each cam gear 16 are locked in a new angular position, one of which is locked underneath its associated detent 38, fully engaging its cam gear 16. After a shift has been completed and the shift actuating collar 54 is moving back to its original position, the parallel grooves 58 move relative to the pins 60 extending radially from the shift member 48 until the springs pop the pins 60 radially outward into the midpoint of an intersecting helical groove 56.

The shift actuating collar 54 is preferably actuated by a self-centering hydraulic cylinder. For shifts to higher gear ratios (upshifts), the cylinder moves the collar 54 quickly the distance of its stroke to complete a shift. It then returns more gradually to its original centered position. For shifts to lower gear ratios (downshifts), the cylinder moves the collar 54 in the opposite direction. The force supplied by the hydraulic cylinder must be great enough to move the collar 54 and cause the shift member 48 to rotate relative to the drum 14, thus moving the detents 38 in and out of their respective to-be-engaged and engaged positions in the time required to start a shift. The cam surfaces 46 and contour of the engaging portion 40 of the detents 38 are configured in a manner that controls the shifting.

Figure 2:
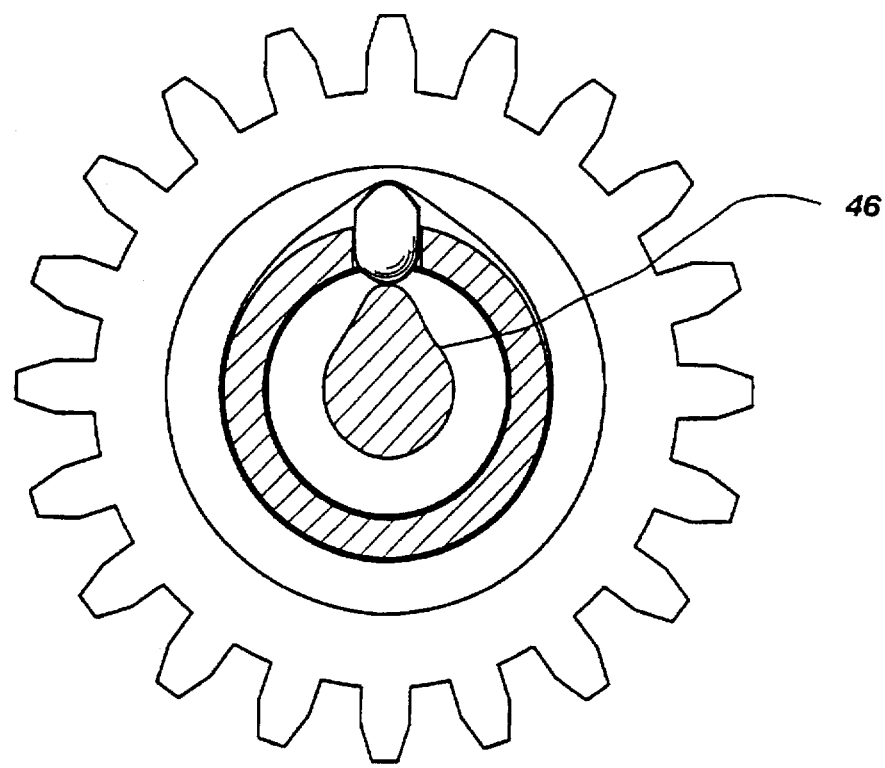
FIG. 2 is an end view of one of the cam gears illustrated in FIG. 1 showing a one valley cam gear with the detent in the engaged position.
Figure 3:
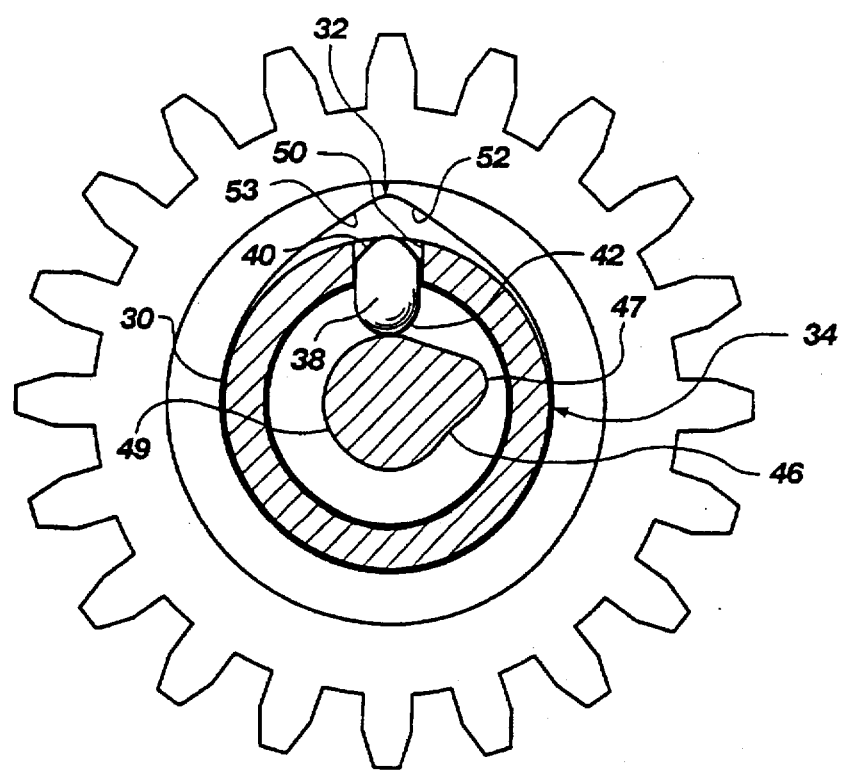
FIG. 3 is an end view of one of the cam gears illustrated in FIG. 1 showing a one valley cam gear with the detent in the disengaged position.

Thus far, this specification has assumed a shift member 48 with radial cam grooves which rotates about its longitudinal axis to complete a shift, as shown in FIGS. 1 through 3. Other shift member 48 configurations are possible which define radial detent 38 motion for a corresponding shift member 48. For example, the cam grooves could follow a corkscrew configuration, for which screw-like rotation/translation of the shift member 48 would produce a shift. In addition, the shift member 48 could be replaced by a hydraulic fluid arrangement, for actuating proper radial detent movement. Moreover, the bullet and detent can be combined into a single collar when only 8 two cam gear transmission is utilized. In this embodiment, the bullet/detent collar is located between the two cam gears whose cam surfaces are located on their in-between sides. The corresponding cam surfaces on the bullet/detent collar are located on both ends of the collar for engagement with the cam surfaces on the cam gears.

Figure 9:
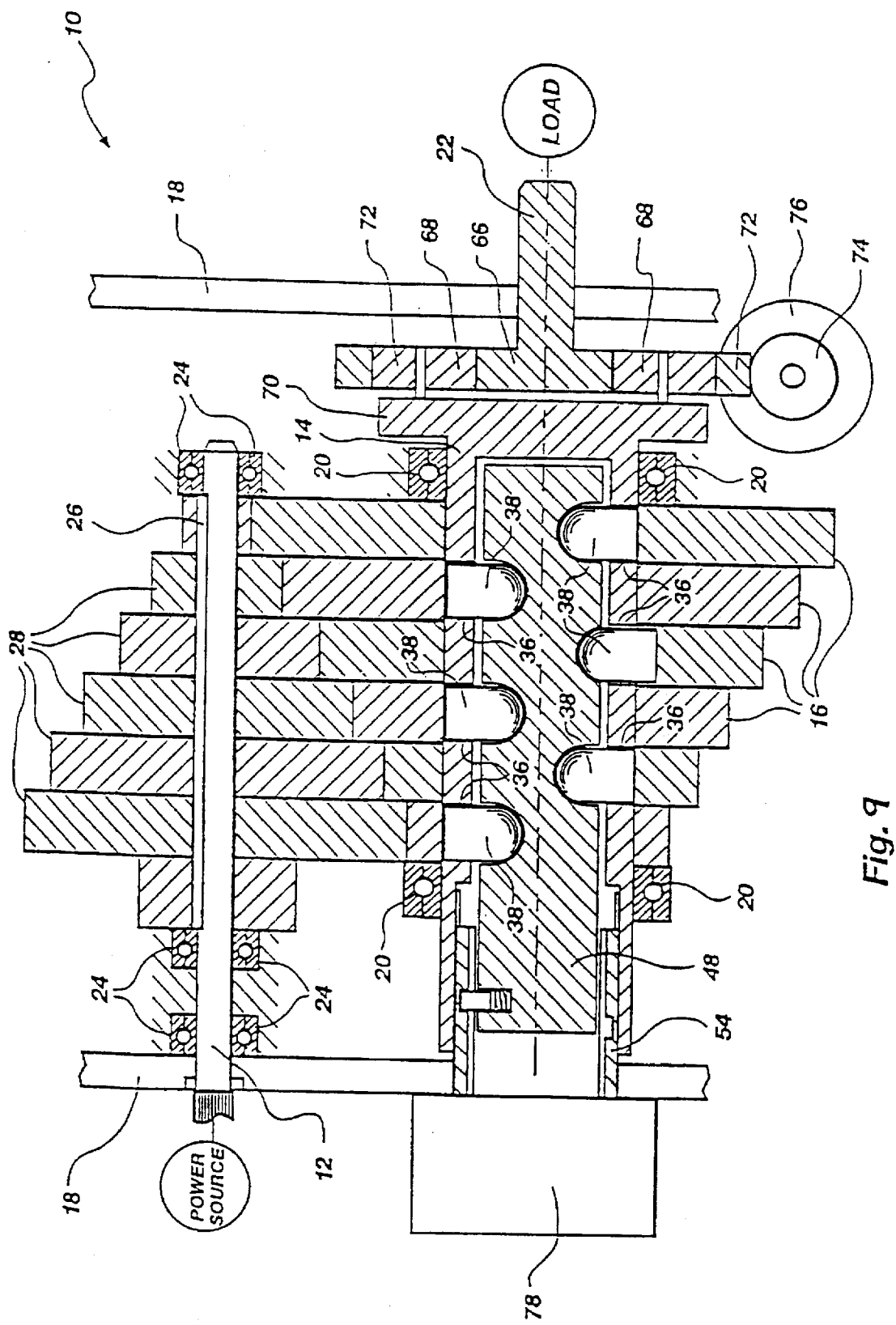
FIG. 9 is a partially schematic side elevational view, in cross section, of a transmission apparatus with the reconciling means associated with the driven means.

As discussed previously, the present invention eliminates a "torque spike" resulting from a change in gear ratios through a reconciling means which is used to match the speed of the driving means with that of the driven means as the relative speed is varied. The preferred embodiment of the reconciling means is accomplished by incorporating a planetary gear system 64 into either the driving or driven means. FIG. 1 illustrates the reconciling means associated with the driving means, and FIG. 9 illustrates the reconciling means associated with the driven means. The planetary gear system 64 includes a sun gear 66, three planetary gears 68 which rotate about the sun gear 66 and rotate inside a hollow ring gear 72, and a carrier, or arm, 70 attached to the planetary gears 68. The planetary gears 68 rotate about axes that are themselves rotating. One skilled in the art will recognize the planetary gear system 64 will function with at least one or more planetary gears 68. The planetary's sun gear 66 is rigidly attached to the input shaft 12 and it's carrier 70 is rigidly attached to the drum 14. The input shaft 12 and drum 14 may be connected to any combination of the planetary gears to effectuate the same purpose. During a gear shift, the ring gear 72 of the planetary gear system 64 is used as a second input and is accelerated or decelerated in advance of a gear shift by a pinion gear 74 attached to a secondary power source 76, such that the motor speed is reconciled to the load speed. After a gear shift, the ring gear 72 is held fixed by means of a brake or the secondary power source 76 during operation of the transmission 10. A calibrated version of the same signal used to accelerate the ring gear 72 of the torque spike anticipator (reconciling means) and generated by a timing mechanism measuring the angular position of the cam gears 16 causes the secondary power source 76 to act.

The reconciling means may also include a cushioning means for absorbing repercussions in the transmission 10 during gear changes. In the preferred embodiment, the cushioning means comprises a hydraulic and air accumulator.

As stated above, all of the gear pairs are continuously engaged with the driven gears 28 which are affixed to the output shaft 22. However, only one of the cam gears 16 is engaged to the input shaft 12 via the detents 38 for that cam gear 16 of the pair. Power is transmitted from the input shaft 12 to the output shaft 22 via the one engaged gear pair.

A controller 78 receives inputs from a position sensor which generates information as to the angular velocity and instantaneous position of the drum 14, and a shift command which indicates that a shift should take place as well as whether it is to be an upshift or a down shift. Upon the coincidence of a shift command and the start of the next shift window, the controller 78 operates the rotational movement of the shift actuating collar 54. With the illustrated implementation, the distance the shift member 48 must rotate is substantially the same for an upshift or a downshift, and between any gear pair.

The time during which a shift takes place, termed the shift window, is a function of a number of variables but can be designed to be a fixed number of degrees of rotation times the difference in angular velocity between the engaged cam gear 16 and the to-be-engaged cam gear 16. Because an engaged cam gear 16 and a to-be-engaged cam gear 16 are both referenced to the drum 14 through their respective gear ratios of their gear pairs, the difference in angular velocity between them is a constant times the angular velocity of the drum 14. This constant, while fixed for either an upshift or a downshift, varies among the different gear ratios but can be designed to linearly decrease for an upshift cycle and to linearly increase for a downshift cycle.

Shifting Sequence

The power flow characteristics (speed and torque) through the transmission 10 can be changed by unlocking an engaged cam gear 16 from the drum 14 while simultaneously locking an adjacent disengaged cam gear 16 to it. This is a gear "shift" which will vary the relative speeds of the input shaft 12 and output shaft 22 depending upon the change in the gear ratios of the gear pairs shifted between. The shift can be an upshift or a downshift depending upon whether the gear ratio is increased or decreased as a result of the shift.

For this specification, the active gear pair is the pair of gears that are currently transmitting power. An upshift is a change in the active gear pair such that the ratio of the speed of the input shaft 12 to the speed of the output shaft 22 is a numerically larger number, for example, a shift from the gear ratio (input to output) of 4:1 to a gear ratio of 5:1. A downshift is a change in the active gear pair such that the ratio of the speed of the input shaft 12 to the speed of the output shaft 22 is a numerically smaller number, for example, a shift from the gear ratio (input to output) of 5:1 to a gear ratio of 4:1.

The shifting time and the sequence of detent 38 movements are the result of the configuration of the cam surfaces 30 on the cam gears 16, the shift member 48, the positioning mechanism (shift actuating collar 54), the gear ratios, and the initial angular velocity of the drum 14. The design and arrangement of the components that constitute the output shaft 22 and the associated positioning mechanism for moving the shift member 48 also influence the shifting operation. The following description of the shifting sequence will start with the transmission apparatus 10 rotating with the active gear pair in the mid-range of the transmission 10. This means that the transmission 10 is operating in a gear ratio from which it can be either upshifted or downshifted. The power flow enters through the input shaft 12 and is modified in speed and in torque by the gear ratio of the active gear pair.

The active gear pair is locked to the drum 14 because the shift member 48 has been positioned under the detents 38 for that gear pair, thereby forcing the active gear pair's corresponding detents 38 radially outward into the open spaces formed by the valley section 32 in the cam surface 30 cut into the inner periphery of the annular cam gear 16. The bottom ends of the detents 42 are held in their outermost radial position in the valley section 32 by the corresponding cam grooves 44 of the shift member 48. Therefore, the cam gear 16 and the drum 14 are locked together with the cam gear 16 engaged and driving the driven gear 28.

All other detents 38 for the gear pairs, other than the active gear pair, are being held radially inward in position against the peak section 34 of the cam surface 30 of their respective cam gears 16 by the shift member 48. Any force acting between the detents 38 and the cam surface 30 of such an "inactive" cam gear 16 has a radial component which drives the detents 38 radially inward, and hence, the inactive cam gears 16 are free to rotate relative to the drum 14. As discussed previously, the shift member grooves 44 can be designed to trap the detents 38 radially inward in order to ensure that they follow the shift member's grooved surface 44 and that the inactive cam gears 16 are therefore free to rotate relative to the drum 14.

The inactive gear pairs adjacent to the active gear pair have gear ratios that are different from that of the active gear pair. Therefore, the inactive cam gears 16 on the drum 14 that are adjacent to the active cam gear 16 are moving relative to the active cam gear 16. Each adjacent inactive cam gear 16 is also moving relative to the drum 14, and the corresponding detents 38 of the inactive cam gears 16 are all retracted into the inactive apertures 36 of the drum 14. The magnitudes of these relative motions are different for each inactive cam gear 16 and depend on the differences between the gear ratios of the active and the inactive cam gears 16.

The relative motion between the active cam gear 16 and an inactive cam gear 16 causes the valley section 32 of the cam surfaces 30 of the inactive cam gear 16 and its retracted detents 38 in the drum 14 to periodically coincide or line up. When the valley section 32 of the cam surface 30 and the detents 38 for either of the cam gears 16 adjacent to the active cam gear 16 line up, a gear shift can occur. In other words, as the valley section 32 of the cam surface 30 and the detents 38 for either inactive cam gear 16 adjacent to the active cam gear 16 approach coincidence, the shift sequence can start. For every rotation of the engaged cam gear 16, the adjacent higher speed cam gear 16 rotates a fraction more than once. To ensure at least one shifting position per revolution, this fraction must be an integer multiple of the reciprocal of the number of cam segments in the cam gear 16. For example, if the cam gear has six segments (i.e., six valley sections 32 and six peak sections 34), the additional rotation must be at least one-sixth of a rotation or sixty degrees more than one revolution. This principle applies for each consecutive cam gear 16. For every rotation of the engaged cam gear 16, the adjacent higher speed cam gear 16 must travel at least one-sixth, one-third (two-sixths), one-half (three-sixths), two-thirds (four-sixths), or five-sixths and so on, more than the engaged cam gear 16. When two shifting positions are desired in one rotation, the fractional increase must also be a multiple of two. The different amounts of rotation from one cam gear 16 to the next adjacent cam gear 16 as well as the number of cam gears 16 all affect the positions at which the shift can be initiated. During the shift sequence, the engaged detents 38 of the active cam gear 16 must be allowed to retract in order for the shift to continue to take place. This is accomplished by the timed synchronous movement of the shift member 48.

Downshifting

A downshift requires that the cam gear 16 of the adjacent gear pair having a numerically smaller gear ratio be engaged by its detents 38 while disengaging the detents 38 of the active gear pair. The following description assumes there is only one peak section 34 and one valley section 32 on the cam surface 30 on each cam gear 16 and thus only one detent 38 associated with each cam gear 16.

Because the to-be-engaged gear pair has a numerically smaller gear ratio, the to-be-engaged cam gear 16 on the drum 14 is rotating at a faster rate than the drum 14 and engaged cam gear 16. Hence, the detents 38 in the apertures 36 of the drum 14 which are to be aligned with the to-be-engaged cam gear 16 are rotating slower than the cam gear 16. Therefore, after a certain angle of rotation, the detents 38 of both cam gears 16 will be movable into the positions required to begin a shift.

For a downshift, the secondary power source 76 accelerates the ring gear 72 which increases the angular velocity of the drum 14. At substantially the same time, the shift member 48 holding the engaged detent 38 in place has been actuated to allow the engaged detent 38 to withdraw radially inward and to simultaneously allow the to-be-engaged detent 38 to slide radially outward along their respective cam surfaces 30. As the engaged detent 38 withdraws, it slides radially inward along first incline section 52 of the corresponding cam gear 16 just as fast as the to-be-engaged detent 38 can slide radially outward along the first incline section 52 of the to-be-engaged cam gear 16. Any torque provided by the secondary power source 76 beyond that required to accelerate the drum 14 at the rate defined by the first incline section 52 of the to-be-engaged cam gear 16 is transmitted to the load through both the to-be-engaged and the formerly-engaged (and withdrawing) detent 38. Both detents 38 continue to move until the to-be-engaged detent 38 reaches its fully inserted position where it locks its cam gear 16 to the drum 14, at which time the drum 14 rotation rate is determined by the gear ratio of the newly active gear pair.

For a downshift, the final drum 14 rotation rate will be faster than the rotation rate before the shift. However, the input shaft 12 and the output shaft 22 are still rotating at substantially the same speeds as before the shift. The difference in new and old gear ratios is reconciled by the ring gear 72, previously accelerated and now rotating at a substantially constant angular velocity such as to allow the speed of the output shaft 22 to determine the speed of the drum 14 and to reconcile this with the continuous speed of the input shaft 12. The ring gear 72 is now brought to rest by either a brake or the secondary power source 76. The deceleration of the ring gear 72 forces the reconciliation of the input shaft 12 and the output shaft 22. The input shaft 12 must speed up and/or the output shaft 22 must slow down. This same reconciliation must occur with the No. '501 Lee application. However, the torque spike anticipator (planetary gear system 64) allows the reconciliation to occur over a much longer period of time. When the ring gear 72 is brought to rest, the process has been completed.

The ability to predetermine the lining up of the valley section 32 of the cam surface 30 of the engaged cam gear 16 with the peak section 34 of the cam surface 30 of an adjacent unengaged cam gear 16 for the purpose of initiating a shift is a product of, and timed with reference to, the angular rotation of the drum 14, If the slower speed cam gear 16 travels X degrees for each rotation of the drum 14, then the higher speed cam gear 16 travels X+YX degrees, where Y is a variable parameter determined by the ratio between pairs of adjacent cam gears 16. If these cam gears 16 traveled at the same velocity there would not be any potential for creating a gear shift. The difference between the angular rotations caused by the difference in the gear ratios of adjacent cam gears 16 affects the shift interval (the angular rotation of the input shaft 12 required to complete a shift). Thus, (X+YX)–X represents the arc difference between cam gears 16.

Upshifting

An upshift requires that the cam gear 16 having a numerically larger gear ratio be engaged by its detents 38 while disengaging the detents 38 of the active gear pair.

Because the to-be-engaged gear pair has a numerically larger gear ratio, the to-be-engaged cam gear 16 is rotating at a slower rate than the drum 14 and the engaged cam gear 16. Therefore, after a certain angle of rotation, the detents 38 of the engaged and to-be-engaged cam gears 16 will be movable into the positions required to begin a shift.

For an upshift, the secondary power source 76 accelerates the ring gear 72 in such a manner as to decrease the angular velocity of the drum 14. To do so, the ring gear 72 must be accelerated in the opposite direction from that required for a downshift. At substantially the same time, the shift member 48 holding the engaged detent 38 in place has been actuated to allow the engaged detent 38 to withdraw radially inward and to simultaneously allow the to-be-engaged detent 38 to slide radially outward along their respective cam gear surfaces. As the engaged detent 38 withdraws, it slides radially inward along second incline section 53 of the corresponding cam gear 16 just as fast as the to-be-engaged detent 38 can slide radially outward along the second incline section 53 of the to-be-engaged cam gear 16. Both detents 38 continue to move until the to-be-engaged detent 38 reaches its fully inserted position where it locks its cam gear 16 to the drum 14, at which time the drum 14 rotation rate is determined by the gear ratio of the newly active gear pair. Reversing the direction of rotation of the drum 14 by means of the torque spike anticipator, allows the second incline section 53 to also be used for downshifting, as well as upshifting.

For an upshift, the final drum 14 rotation rate will be slower than the rotation rate before the shift. However, the input shaft 12 and the output shaft 22 are still rotating at substantially the same speeds as before the shift. The difference in new and old gear ratios is reconciled by the ring gear 72, previously accelerated and now rotating at a substantially constant angular velocity such as to allow the speed of the output shaft 22 to determine the speed of the drum 14 and to reconcile this with the continuous speed of the input shaft 12. The ring gear 72 is now brought to rest by either a brake or the secondary power source 76. The deceleration of the ring gear 72 forces the reconciliation of the input shaft 12 and the output shaft 22. The input shaft 12 must slow down and/or the output shaft 22 must speed up. When the ring gear 72 is brought to rest, the process has been completed.

During an upshift, any excess torque provided by the secondary power source 76 tends to slow the output shaft 22 down and/or speed the input shaft 12 up. This result is contrary to the desired condition. However, this condition can be overcome by using the planetary gear system 64 only for a downshift. For an upshift, high-pressure hydraulic oil placed in the valley section 32 of the to-be-engaged cam gear 16 would have the effect of decelerating the drum 14 and causing the input shaft 12 to slow down under increased load.

The present invention allows a shift to occur over a much longer period of time than the invention disclosed in the No. '501 application. This extended shift time allows the motor and/or load to make the appropriate adjustments without causing excessive stresses in the transmission. With the anticipative method achieved by the torque spike anticipator, the drum 14 works in conjunction with the change of speeds for both and upshift and downshift.

In summary, the method and apparatus disclosed herein is a significant improvement from the present state of the art in variable speed transmissions. The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A variable speed transmission apparatus for changing the speed of a driven member relative to the speed of a driving member, comprising:

a plurality of driven gears;

a plurality of annular cam gears each in continuous driving engagement with a corresponding one of said driven gears, each of said cam gears having an inner cam surface with at least one peak and at least one valley;

a hollow drum mounted for rotation about an axis and having a plurality of apertures extending from an inner drum surface to an outer drum surface, at least one of said apertures corresponding to each of said cam gears, and said cam gears being mounted for rotation about said outer drum surface with said inner cam surface opposite to said at least one corresponding aperture;

a plurality of detents, one corresponding to each of said drum apertures and each arranged for reciprocating radial movement within its corresponding drum aperture;

a shift member mounted within said drum for axial rotation about said drum axis, said shift member comprising one or more cam surfaces disposed radially around the rotational axis of the shift member for respectively engaging said detents to hold the engaged detent in a first position at which it engages the valley of the corresponding cam gear, and a second position at which the detent is in a disengaged position;

positioning means for selectively rotating said shift member in either axial direction relative to said drum so as to cause a selected detent to engage the valley of its corresponding cam gear such that a driving connection is made between said driving member and said driven member through said engaged cam gear, the inner cam surface of said cam gears and the outer cam surface of said shift member being contoured relative to each other to time the axial rotation of said shift member such that said axial movement may commence only about when the peak of the cam gear to be disengaged from its corresponding detent is substantially aligned with the valley of an adjacent cam gear to be engaged by its corresponding detent, and said axial movement may cease only about when the valley of the cam gear to be disengaged is substantially aligned with the peak of the adjacent cam gear to be engaged; and reconciling means for matching the relative speed of the driving member with that of the driven member during disengagement and engagement between selected cam gears.

2. A variable speed transmission according to claim 1, wherein the shift member comprises an outer cam surface which includes first and second portions, the first portion having a greater diameter than the second portion and adapted to hold a detent in an engaged position wherein the detent extends through an aperture in the drum to engage a cam gear on the driving shaft, and the second portion having a lesser diameter than the first portion and adapted to hold a detent in a disengaged position.

3. A variable speed transmission according to claim 2, wherein the outer cam surface includes contoured cam grooves disposed between the first and second portions to facilitate alternate movement of the detents between the engaged and disengaged positions responsive to rotating movement of the shift member.

4. A variable speed transmission according to claim 1, wherein the positioning means for effectuating a shift between cam gears comprises a shift actuating collar integrally attached to one end of the drum, wherein the shift actuating collar is substantially cylindrical in shape having a hollow central bore, said collar further comprising a first and second end wherein the first end includes circumferential splines on the outer surface for engagement with corresponding circumferential splines on the inner surface of the drum, a plurality of parallel grooves having first and second ends, said parallel grooves located on the inner surface of the collar and extending parallel to its longitudinal axis at a constant radial distance, a plurality of helical grooves having first and second ends and located on the inner surface of the collar, said helical grooves extending helical to the longitudinal axis of the collar at a radial distance greater than the radial distance of the parallel grooves at its midpoint and at a radial distance less than the radial distance of the parallel grooves at the first and second ends, each second end of the helical groove being connected to the corresponding first end of the parallel groove and each first end of the helical groove being connected to the corresponding second end of the parallel groove in succeeding fashion such that a step extends radially outward as the helical groove merges into the parallel groove, said helical grooves and parallel grooves forming a closed loop and intersecting at their respective midpoints, a plurality of spring-loaded pins extending radially outward from the shift member, and a controller for rotating the collar in either rotational direction, thereby causing rotation of the shift member.

5. A variable speed transmission according to claim 4, wherein the grooves are configured such that during full engagement of any of the gear pairs the pins extending from the shift member are locked in one angular position with respect to the collar.

6. A variable speed transmission according to claim 4, wherein a shift is actuated upon translation of the shift actuating collar along the splines of the drum, said helical grooves thereby forcing the pins radially inward and rotating the shift member at a fixed angle relative to the drum and said shift member being locked into position as the pin steps from the second end of the helical groove into the first end of the parallel groove.

7. A variable speed transmission according to claim 4, wherein the shift actuating collar is moved back to its original position after a shift has been completed.

8. A variable speed transmission according to claim 4, wherein the parallel grooves move relative to the spring-loaded pins until the springs pop the pins radially outward into the midpoint of an intersecting helical groove after the shift actuating collar completes a shift.

9. A variable speed transmission according to claim 4, wherein the controller is a self-centering hydraulic cylinder.

10. A variable speed transmission according to claim 4 wherein the controller regulates the operation of the reconciling means, shift actuating collar, and angular position of the cam gears.

11. A variable speed transmission apparatus according to claim 1, wherein a power source is supplied to the driving member for causing rotational movement of said driving member, and the driven member being connected to a load.

12. A variable speed transmission apparatus according to claim 1, wherein a power source is supplied to the driven member for causing rotational movement, and the driving member being connected to a load.

13. A variable speed transmission apparatus according to claim 1, wherein the reconciling means comprises a planetary gear system, said planetary gear system further comprising a sun gear connected to a power source, at least one planetary gear for rotation about the sun gear, a hollow ring gear, wherein the ring gear further includes an inner toothed surface, said planetary gear rotating about the inner toothed surface of said ring gear and said sun gear disposed within the ring gear such that the sun gear rotates about the same longitudinal axis as the ring gear, said planetary gear positioned between said ring gear such that said planetary gear rotates about an axis that is itself rotating, and a secondary power source for rotating the ring gear.

14. A variable speed transmission apparatus according to claim 13, wherein the sun gear is connected to the driving member.

15. A variable speed transmission apparatus according to claim 13, wherein said planetary gear system includes three planetary gears connected by a carrier, said carrier connected to the driving member.

16. A variable speed transmission apparatus according to claim 15, wherein the carrier is connected to a power source.

17. A variable speed transmission apparatus according to claim 13, wherein the ring gear further includes an outer toothed surface which is continuously engaged with and powered by a pinion attached to the secondary powering source.

18. A variable speed transmission apparatus according to claim 13, wherein the ring gear is accelerated by the secondary powering source, thereby accelerating the driving member so as to reconcile the speed of the driving member with the driven member as the relative speed is varied.

19. A method for shifting a variable speed transmission apparatus, comprising the steps of:

a) providing a driving member for causing a driven member to move in response to movement of the driving member;

a plurality of annular cam gears each in continuous driving engagement with a corresponding one of said driven gears, each of said cam gears having an inner cam surface with at least one peak and at least one valley;

a hollow drum mounted for rotation about an axis and having a plurality of apertures extending from an inner drum surface to an outer drum surface, at least one of said apertures corresponding to each of said cam gears, and said cam gears being mounted for rotation about said outer drum surface with said inner cam surface opposite to said at least one corresponding aperture;

a plurality of detents, one corresponding to each of said drum apertures and each arranged for reciprocating radial movement within its corresponding drum aperture;

a shift member mounted within said drum for axial rotation about said drum axis, said shift member comprising one or more cam surfaces extending radially around the rotational axis of the shift member for respectively engaging said detents to hold the engaged detent in a first position at which it engages the valley of the corresponding cam gear, and a second position at which the detent is in a disengaged position;

b) rotating said shift member in either axial direction relative to said drum so as to cause a selected detent to engage the valley of its corresponding cam gear such that a driving connection is made between said driving member and said driven member through said engaged cam gear, the inner cam surface of said cam gears and the outer cam surface of said shift member being contoured relative to each other to time the axial rotation of said shift member such that said axial movement may commence only about when the peak of the cam gear to be disengaged from its corresponding detent is substantially aligned with the valley of an adjacent cam gear to be engaged by its corresponding detent, and said axial movement may cease only about when the valley of the cam gear to be disengaged is substantially aligned with the peak of the adjacent cam gear to be engaged, and c) reconciling the relative speed at which power from the driving member is provided to the driven member.

20. A method for shifting a variable speed transmission apparatus according to claim 19, wherein the power is provided to the driving member by an independent power source.

21. A method for shifting a variable speed transmission apparatus according to claim 20, wherein the independent power source is a self contained internal combustion engine.

22. A method for shifting a variable speed transmission apparatus according to claim 19, wherein the reconciling means comprises a planetary gear system, said planetary gear system further comprising a sun gear rigidly attached to a power source, at least one planetary gear for rotation about the sun gear, a hollow ring gear, wherein the ring gear further includes an inner toothed surface, said planetary gear rotating about the inner toothed surface of said ring gear and said sun gear disposed within the ring gear such that the sun gear rotates about the same longitudinal axis as the ring gear, said planetary gear positioned between said ring gear and said planetary gear thereby rotating about axes that are themselves rotating, and a secondary power source for rotating the ring gear.

23. A method for shifting a variable speed transmission apparatus according to claim 22, wherein said planetary gear system includes three planetary gears connected by a carrier, said carrier rigidly attached to the driving member.

24. A method for shifting a variable speed transmission apparatus according to claim 23, wherein the steps of reconciling the relative speed of the driving member to that of the driven member is accomplished by accelerating the ring gear by means of a secondary power source, thereby accelerating the driving member through the planetary gear system to match that of the driven member.

* * * * *